US011998780B2

(12) United States Patent
Laskaris et al.

(10) Patent No.: US 11,998,780 B2
(45) Date of Patent: Jun. 4, 2024

(54) FIRE-FIGHTING CONTROL SYSTEM

(71) Applicant: Akron Brass Company, Wooster, OH (US)

(72) Inventors: Michael A. Laskaris, Collegeville, PA (US); Jason Cerrano, Wentzville, MO (US); James M. Johnson, Ashland, OH (US); Daniel B. Teixeira, Fairlawn, OH (US)

(73) Assignee: Akron Brass Company, Wooster, OH (US)

(*) Notice: Subject to any disclaimer, the term of this patent is extended or adjusted under 35 U.S.C. 154(b) by 0 days.

(21) Appl. No.: 17/930,962

(22) Filed: Sep. 9, 2022

(65) Prior Publication Data

US 2023/0001247 A1 Jan. 5, 2023

Related U.S. Application Data

(62) Division of application No. 16/947,705, filed on Aug. 13, 2020, now Pat. No. 11,439,856.

(60) Provisional application No. 62/886,543, filed on Aug. 14, 2019.

(51) Int. Cl.
*A62C 37/00* (2006.01)
*A62C 37/36* (2006.01)

(52) U.S. Cl.
CPC .................................... *A62C 37/04* (2013.01)

(58) Field of Classification Search
CPC ......... A62C 37/04; A62C 37/00; A62C 27/00; A62C 31/28; A62C 31/005; A62C 31/05; A62C 37/40
See application file for complete search history.

(56) References Cited

U.S. PATENT DOCUMENTS

| | | | |
|---|---|---|---|
| 4,913,657 | A | 4/1990 | Naito et al. |
| 5,044,445 | A | 9/1991 | Kayahara |
| 5,109,534 | A | 4/1992 | Naito et al. |
| 6,116,520 | A | 9/2000 | Lee |
| 6,276,133 | B1 | 8/2001 | Yoshida et al. |
| 6,607,038 | B2 | 8/2003 | Ebersole et al. |

(Continued)

FOREIGN PATENT DOCUMENTS

| | | |
|---|---|---|
| CN | 102707741 B | 10/2012 |
| CN | 102884407 B | 1/2013 |

(Continued)

OTHER PUBLICATIONS

International Search Report and Written Opinion issued in connection with PCT/US2020/046214 dated Nov. 27, 2020; pp. 1-20.

(Continued)

*Primary Examiner* — Qingzhang Zhou
(74) *Attorney, Agent, or Firm* — Armstrong Teasdale LLP

(57) ABSTRACT

A fire-fighting system includes a pump, a nozzle for directing fluid flow from the pump to a target area, a discharge valve controlling fluid flow between the pump and the nozzle, a sensor coupled to the nozzle, and a controller communicatively coupled to the sensor. The sensor detects movement of the nozzle and generates a signal indicative of the detected movement. The controller communicatively coupled is configured to receive the signal from the sensor, and control at least one of the discharge valve, the pump, and the nozzle based on the detected movement of the nozzle.

20 Claims, 5 Drawing Sheets

(56) References Cited

U.S. PATENT DOCUMENTS

| | | | | |
|---|---|---|---|---|
| 8,919,979 | B2 | 12/2014 | Mabry et al. | |
| 9,295,862 | B2 | 3/2016 | Cerrano | |
| 9,399,151 | B1 | 7/2016 | Combs et al. | |
| 9,649,519 | B2 | 5/2017 | Lozier et al. | |
| 2003/0006045 | A1 | 1/2003 | Ebersole et al. | |
| 2005/0247362 | A1 | 11/2005 | Harcourt et al. | |
| 2006/0131038 | A1 * | 6/2006 | Lichtig | A62C 33/06 169/52 |
| 2007/0164127 | A1 * | 7/2007 | Lozier | A62C 37/36 222/25 |
| 2009/0218110 | A1 | 9/2009 | Laskaris et al. | |
| 2010/0168927 | A1 | 7/2010 | Burrows | |
| 2011/0200461 | A1 | 8/2011 | Christensen et al. | |
| 2012/0305273 | A1 | 12/2012 | Lozier | |
| 2013/0105010 | A1 | 5/2013 | McLoughlin | |
| 2013/0186651 | A1 | 7/2013 | Cerrano | |
| 2015/0130924 | A1 | 5/2015 | Mabry, Jr. et al. | |
| 2015/0131262 | A1 | 5/2015 | Mabry, Jr. et al. | |
| 2016/0078733 | A1 | 3/2016 | Cerrano et al. | |
| 2016/0184619 | A1 | 6/2016 | Cerrano | |
| 2016/0243388 | A1 | 8/2016 | McDaniel | |
| 2017/0095682 | A1 | 4/2017 | Combs | |
| 2017/0164127 | A1 | 6/2017 | Gautama et al. | |
| 2017/0308796 | A1 | 10/2017 | Heng et al. | |
| 2018/0185682 | A1 | 7/2018 | Cerrano | |
| 2018/0221697 | A1 | 8/2018 | Shively et al. | |
| 2019/0366911 | A1 | 12/2019 | Cerrano | |

FOREIGN PATENT DOCUMENTS

| | | | |
|---|---|---|---|
| CN | 106462129 | A | 2/2017 |
| CN | 108969948 | A | 12/2018 |
| DE | 102008063764 | A1 | 6/2010 |
| JP | 2007170309 | A | 7/2007 |
| TW | 201217029 | A | 5/2012 |
| WO | 2019020191 | A1 | 1/2019 |

OTHER PUBLICATIONS

Written Opinion and Search Report issued in Singapore Patent Application Serial No. 11202251263U dated Mar. 19, 2024, pp. 1-10.

* cited by examiner

FIRE-FIGHTING CONTROL SYSTEM

CROSS REFERENCE TO RELATED APPLICATIONS

This application is a divisional of U.S. patent application Ser. No. 16/947,705, filed Aug. 13, 2020, which claims priority to U.S. Provisional Patent Application No. 62/886,543, filed Aug. 14, 2019, the disclosures of which are incorporated herein by reference in their entirety.

BACKGROUND

The present disclosure relates generally to control systems and, more specifically, to control systems for use in controlling a fire-fighting device.

Fire-fighting pumper trucks (broadly referred to herein as a "fire-fighting device") are used to fight fires by pumping fluid (e.g., water, foam, or another flame retardant) from a source through hose lines wherein the fluid may be directed (i.e., sprayed) on a fire to facilitate the extinguishing or containing the fire. Known pumper trucks include control systems used to regulate the operation of the truck and to control the flow of fluid from the truck into the hose lines. Such control systems generally include a plurality of valves used to control the flow of fluid to a fire pump from a storage tank transported onboard the truck or from another fluid supply source (e.g., a fire hydrant). The valves also facilitate control of the flow of fluid from the fire pump to fire hoses or other discharge devices. Known control systems include pressure and flow rate sensors used to monitor the pressure and flow rate of fluid at various locations within the pumper truck. For example, pressure sensors may monitor the pressure of the fluid received by the fire pump from the supply source. Generally, the pumper truck controls used to regulate the valves and the fire pump are commonly positioned in a control panel on the side of the pumper truck.

In some known fire-fighting systems, during use, the firefighter may open a nozzle valve using a bail on the nozzle to release fluid from the nozzle to a target area. If the firefighter becomes separated from the nozzle, the nozzle valve may remain open, causing the nozzle to flail about erratically. In some fire-fighting systems, the associated discharge valve at the truck must be shut off in order to stop the flailing of the nozzle. Additionally, in some other known fire-fighting systems, if the firefighter becomes separated from the nozzle, the nozzle may be difficult to locate in a low visibility fire-fighting scene. As such, at least some known nozzles may include an indicator to aid the firefighter in locating the nozzle. However, such nozzles generally require that the indicator be activated at a pumper truck or at another control location not immediately accessible to the firefighter. Accordingly, known fire-fighting safety systems generally require some communication between the firefighter and an operator at the pumper truck. As a result, such systems may not be well-suited for instances where the firefighter has become separated from his nozzle and/or is unable to communicate with a crewmember at the pumper truck.

Additionally, some known fire-fighting control systems may control the valves and pump based on desired preset pressures or user-requested pressures at the nozzles. Such systems may generally include a pressure sensor located at the pumper truck. However, pressure measurements taken from a pressure sensor located at the pumper truck may not accurately reflect the fluid pressure at the nozzle, due to for example, a delay in fluid flow between the pumper truck and the nozzle. Accordingly, at least some known control systems may include a pressure sensor at the nozzle. However, in some such systems, transmission gaps or a loss of signal between the pressure sensor and the control system at the pumper truck can cause disruptions to the desired fluid flow. Accordingly, known fire-fighting control systems generally are either unable to account for the actual pressure at the nozzle and/or are unable to control the system in a transmission loss with a pressure sensor at a nozzle.

Moreover, some known fire-fighting systems include a storage compartment at the pumper truck for storing one or more hose lines during transportation to and from a scene. The hose lines may be either coupled to a discharge valve during transportation or coupled to the discharge valve upon arriving on the scene. However, at least some such fire-fighting systems may result in a premature charging of the hose line, wherein the discharge valve is opened while the hose is still stored, thereby expanding the hose within the confined area of the hose storage compartment. Premature charging of the hose line(s) in the confined area may result in damage to pumper truck equipment and/or hose line and result in delays in responding to a fire at a scene. Accordingly, known fire-fighting systems require that the firefighters confirm that the hose has been removed from the hose storage compartment prior to charging the line. The reliance on the human observation at the scene increases the firefighter response time by having to delay charging the line until it can be communicated that a sufficient portion of the hose line has been withdrawn from the storage compartment. Moreover, the possibility of human error is also increased as the engineer must also confirm that they are charging the withdrawn hose line and that the hose line is sufficiently withdrawn from the storage compartment. As used herein, the term "engineer" refers to a firefighter generally positioned at a firefighting device whose role relates to controlling operation of the firefighting device. As used herein, the term "nozzleman" generally refers to a firefighter whose role is to control and/or operate a nozzle of the firefighting device to direct fluid flow to target area.

BRIEF DESCRIPTION

In one aspect, a fire-fighting system includes a pump, a nozzle for directing fluid flow from the pump to a target area, a discharge valve controlling fluid flow between the pump and the nozzle, a sensor coupled to the nozzle, and a controller communicatively coupled to the sensor. The sensor detects movement of the nozzle and generates a signal indicative of the detected movement. The controller communicatively coupled is configured to receive the signal from the sensor, and control at least one of the discharge valve, the pump, and the nozzle based on the detected movement of the nozzle.

In another aspect, a controller for controlling a fire-fighting system that includes a pump, a nozzle, and a discharge valve controlling fluid flow between the pump and the nozzle, is configured to receive a signal from a sensor coupled to the nozzle, where the sensor detects movement of the nozzle and the signal is indicative of the detected movement. The controller is further configured to control at least one of the discharge valve, the pump, and the nozzle based on the detected movement of the nozzle.

In yet another aspect, a method of controlling a fire-fighting system that includes a pump, a nozzle, and a discharge valve controlling fluid flow between the pump and the nozzle, includes receiving a signal from a sensor coupled to the nozzle, where the sensor detects movement of the nozzle and the signal is indicative of the detected movement, and controlling at least one of the discharge valve, the pump, and the nozzle based on the detected movement of the nozzle.

In yet another aspect, a nozzle adapted for handheld control by a firefighter includes a body, a beacon coupled to the body and operable to output at least one of an audible and a visual signal when the beacon is activated, and an operator proximity assembly coupled to the body and communicatively coupled to the beacon. The operator proximity assembly activates the beacon in response to detecting that the firefighter has become separated from the body.

In yet another aspect, a nozzle system for use in a fire-fighting environment includes a nozzle adapted for handheld control by a firefighter, a beacon mounted on the nozzle and operable to output at least one of an audible and a visual signal when the beacon is activated, and an operator proximity assembly coupled to at least one of the firefighter and the nozzle. The operator proximity assembly is configured to activate the beacon in response to the firefighter being separated from the nozzle.

In yet another aspect, a method of controlling a fire-fighting system includes detecting, via an operator proximity assembly coupled to at least one of a firefighter and a nozzle adapted for handheld use by the firefighter, that the firefighter is separated from the nozzle, and activating, in response to detecting that the firefighter is separated from the nozzle, a beacon mounted to the nozzle such that the beacon outputs at least one of an audible and a visual signal.

In yet another aspect, a fire-fighting system includes a pump and a nozzle for directing fluid from the pump to a target area. The nozzle includes a first pressure sensor configured to detect a first fluid pressure of the fluid at the nozzle. The fire-fighting system also includes a discharge valve controlling fluid flow between the pump and the nozzle, a second pressure sensor configured to detect a second fluid pressure of the fluid at the discharge valve, and a controller communicatively coupled to the first pressure sensor and the second pressure sensor. The controller is configured to control operation of at least one of the pump and the discharge valve based on a user-requested fluid pressure and the detected first fluid pressure at the nozzle in a primary mode of operation, and control operation of the at least one of the pump and the discharge valve based on the user-requested fluid pressure and the detected second fluid pressure at the discharge valve in a secondary mode of operation when communication between the first pressure sensor and the controller is interrupted.

In yet another aspect, a method of controlling a fire-fighting device includes receiving, at a controller, a first pressure signal from a first pressure sensor coupled to a nozzle, where the first pressure signal is indicative of a first fluid pressure of a fluid at the nozzle, and receiving, at the controller, a second pressure signal from a second pressure sensor located remote from the first pressure sensor, where the second pressure signal indicative of a second fluid pressure of fluid at a discharge valve that controls fluid flow between a pump of the fire-fighting device and the nozzle. The method further includes controlling operation of at least one of the pump and the discharge valve based on a user-requested fluid pressure and the first pressure signal in a primary mode of operation, and controlling operation of the at least one of the pump and the discharge valve based on the user-requested fluid pressure and the second pressure signal in a secondary mode of operation when communication between the first pressure sensor and the controller is interrupted.

In yet another aspect, a controller for use with a fire-fighting device including a pump is configured for communication with a first pressure sensor coupled to a nozzle, and is further configured for communication with a second pressure sensor located remote from the first pressure sensor. The controller is configured to receive a first pressure signal from the first pressure sensor, where the first pressure signal is indicative of a first fluid pressure of a fluid at the nozzle, and receive a second pressure signal from the second pressure sensor, where the second pressure signal is indicative of a second fluid pressure of fluid at a discharge valve that controls fluid flow between the pump and the nozzle. The controller is further configured to control operation of at least one of the pump and the discharge valve based on a user-requested fluid pressure and the first pressure signal in a primary mode of operation, and control operation of the at least one of the pump and the discharge valve based on the user-requested fluid pressure and the second pressure signal in a secondary mode of operation when communication between the first pressure sensor and the controller is interrupted.

In yet another aspect, a fire-fighting system includes a fire-fighting device that includes a discharge valve and a hose storage compartment, and a hose line assembly that includes a hose and a nozzle. The hose extends between a first end removably coupled to the discharge valve and a second end configured to be removably coupled to the nozzle. The hose is movable from a storage position, in which the hose is positioned substantially within the hose storage compartment, to an active position, in which the second end is positioned remote from the fire-fighting device to facilitate directing a fluid flow to a target area. The fire-fighting system also includes a sensor coupled to at least one of the fire-fighting device and the hose line assembly, and a controller in communication with said sensor. The sensor detects whether the hose is in the storage position, and the controller is configured to automatically control an actuation state of the discharge valve based on whether the sensor detects that the hose is in the storage position.

In yet another aspect, a method of controlling a fire-fighting system is provided. The fire-fighting system includes a fire-fighting device including a discharge valve and a hose storage compartment, and a hose line assembly including a hose and a nozzle. The hose is coupled to the discharge valve and the nozzle. The method includes receiving a signal from a sensor coupled to at least one of the fire-fighting device and the hose line assembly, where the sensor is configured to detect whether the hose is in a storage position, in which the hose is positioned substantially within the hose storage compartment, the signal indicating whether the hose is in the storage position. The method further includes controlling automatically, the discharge valve, based at least in part on whether the signal indicates that the hose is in the storage position.

In yet another aspect, a controller for controlling a fire-fighting system is provided. The fire-fighting system includes a fire-fighting device including a discharge valve and a hose storage compartment, and a hose line assembly including a hose and a nozzle. The hose is coupled to the discharge valve and the nozzle. The controller is configured to receive a signal from a sensor positioned on at least one of the fire-fighting device and the hose line assembly, where the sensor detects whether the hose is in a storage position, in which the hose is positioned substantially within the hose storage compartment, the signal indicating whether the hose is in the storage position. The controller is further configured to control, automatically, the discharge valve based at least in part on whether the signal indicates that the hose is positioned substantially within the hose storage compartment.

DETAILED DESCRIPTION

Figure 1:
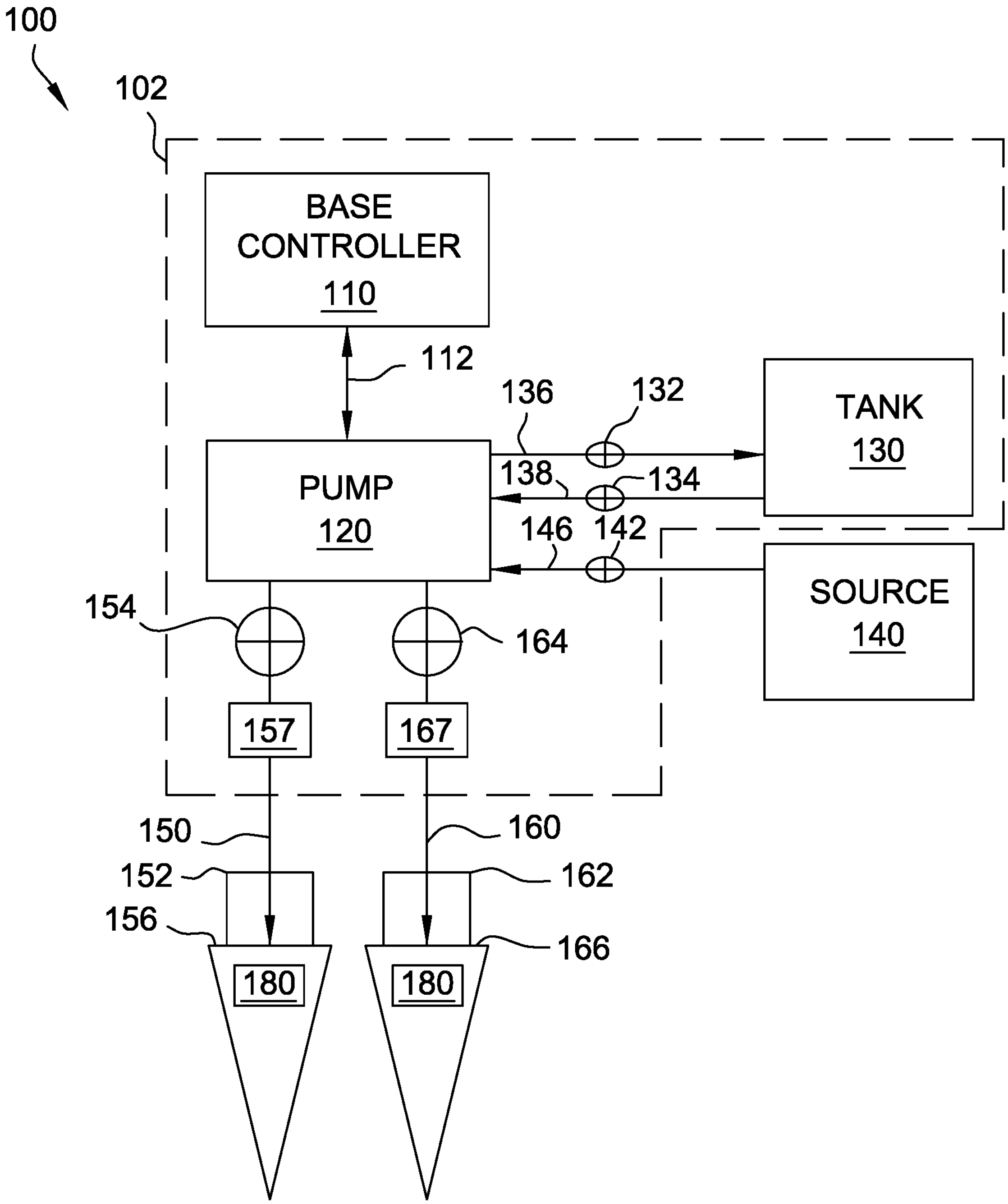
FIG. 1 is a schematic view of an exemplary fire-fighting system.

In some embodiments, a nozzle of the fire-fighting system includes a fluid level indicator operable to display how much fluid is available to flow from the nozzle. The nozzle may include a series of lights that blink at different rates and change color to convey the fluid level in a tank. For example, a slow, green-blinking light may indicate a full tank, an intermittent yellow-blinking light may indicate a partially filled tank, a rapid red-blinking light may indicate a low tank, a solid blue light may indicate a permanent fluid supply, and no light present may indicate a signal loss. In other embodiments, other color combinations and/or blink speeds may be used. In further embodiments, the nozzle may communicate the fluid level of the tank in any manner. For example, in some embodiments, the fluid level of the tank may be communicated via visual (e.g., a bar graph), audible, or haptic feedback. More specifically, in some embodiments, the nozzle includes a speaker and audible signals used to indicate fluid availability and/or the fluid level of the tank. Moreover, a “time to tank empty” signal may be incorporated into a visual or audible system for identification of fluid availability.

Some embodiments described herein enable remote control of fluid pressure and flow to a nozzle. For example, in some embodiments a closed loop control of fluid pressure and flow is accomplished using a pressure transducer, flow meter, and/or some other device in the nozzle. This closed loop system is responsive to the truck system pressure and flow presets and adjusts itself to maintain the rated or specified pressure and/or flow of the nozzle. In some embodiments, the nozzle may include a button or other actuator integrated into the nozzle to enable selective increase or decrease of nozzle pressure and/or flow based on scene identified situations. For example, in some embodiments the nozzle may include multiple buttons that, when pressed simultaneously, actuate a discharge valve at the truck. The nozzle may also include an indicator to the firefighter that the buttons have been depressed. For example, in one embodiment, pressing the buttons cycle LED’s on the nozzle through all the colors (e.g., green, yellow, red, blue) for a limited time to indicate that buttons have been pressed and an indication that the valve is opening to provide fluid.

Some embodiments, described herein include nozzles having various nozzle components/remote components that facilitate remote control of the fire-fighting system at the nozzle. For example, the nozzles described herein may include any of a toggle switch, a rocker switch, and/or a locking collar. In some embodiments, a bail handle on the nozzle may be used to control the discharge valve. Moreover, in some embodiments, the nozzle may include a tactile safety device that indicates to the operator whether a nozzle valve or discharge valve is in the open position. Furthermore, some embodiments include a slide lock on the nozzle. Additionally, in some embodiments, the nozzle and/or other components of the systems may include biometric scanners (e.g., finger print/retinal scanners). In some of such embodiments, biometric scanners may enable selective locking and unlocking of nozzle controls. In yet some other embodiments, the nozzle may include an auto-dimming touchscreen that facilitates control of the systems described herein. For example, in some of such embodiments, a user may be prompted to swipe the screen in a predefined pattern to enable a charge button to be activated, which may open or close a selected discharge valve.

In some embodiments, the systems include a radio frequency identification (RFID) or near-field communication (NFC) system that controls discharge valves of the fire truck to initiate a line charge. For example, in some of such embodiments, a passive RFID tag is positioned on the apparel of the firefighter or incorporated into a part of the fire-fighting equipment, which may trigger a line to be charged. In some embodiments, the RFID system enables automatic pairing of the nozzle with a discharge valve line. For example, in some embodiments, the hose includes a non-intrusive ring/collar/tag that identifies the line. In such embodiments, a fire department could exchange a hose to different lines while only having to confirm that the hose that is being used with the line has the correct RFID tag on it. In alternative embodiments, the hose may be color-coded in accordance with an RFID scanner. Pairing can happen automatically when providing power to the nozzle (e.g., via a charging dock). Alternatively, pairing may be performed via a magnetic pad on a lanyard that could also perform the charging function. In such embodiments, to pair nozzles to a new discharge line, an operator may simply set the magnetic pad near an RFID reader and/or near a tag at the discharge line, until a colored light indicating signaling pairing is displayed.

In some embodiments described herein, the nozzle may store (e.g., via a memory) a pre-set pressure that is communicated to the base controller during operation. Exchanging the nozzles with different calibration pressures may automatically update the setting in the closed loop feedback system. As such, the nozzles can also be switched between different discharge lines and/or valves at the truck with the system/base controller automatically updating the specific discharge lines to control fluid flow to the nozzles based on the associated pre-set pressures stored in the nozzles. Nozzles can be switched at the end of the hose, or entire hose sections that include nozzles can be switched at the truck discharge. The nozzle may be paired with the truck and/or valve to enable the ability to selectively exchange nozzles from one discharge valve to another. In some embodiments, the base controller reverts to a pressure sensor in the truck when a signal to the nozzle is lost. In such embodiments, the base controller includes a memory that stores the last known specified pressure set point received from the nozzle.

Some embodiments described herein include a sensor coupled to the nozzle that detects a movement of the nozzle. Various components of the fire-fighting system may be controlled based on the detected movement. For example, in some embodiments an accelerometer is provided on the nozzle. The nozzle may communicate with a base controller located at the fire truck using a wireless transmitter or a physical communication line. The communication loop can react to, and mitigate hazards, in real-time by detecting unsafe or unintended operating conditions at the nozzle such as, but not limited to, an uncontrolled nozzle. Additionally, in some embodiments, the nozzle may include a Radio Frequency Identification (RFID) or Global Positioning System (GPS) sensors which may enable an accelerated nozzle deployment by communicating nozzle deployment status or location. In some embodiments, the RFID or GPS sensors included in the nozzle can detect when a nozzle is removed from the truck hose bed to be deployed. In addition, in some embodiments, the nozzle may include a shutoff-valve that is mechanically incorporated into the nozzle and in communication with a controller at the nozzle. In some embodiments an actuator or triggered shut-off may be deployed by a controller at the nozzle and/or a base controller at the fire truck. The actuator or triggered shut-off could then be re-set by the firefighter. In alternative embodiments, the remote controller may trigger a shut-off at the truck (e.g., cause a discharge valve to be closed). In some embodiments, the valve could be controlled to re-open from the nozzle via a detection at the nozzle that the nozzle is secured, or by receiving at the nozzle, a new remote demand for fluid. In other alternative embodiments, the remote controller could control a discharge valve at the fire truck via direct communication with a discharge valve controller. For example, in such embodiments, a simple "close" command could be transmitted to a valve controller or a receiving device that is tagged to a valve controller.

In some embodiments, the sensor may additionally or alternatively detect an orientation of the nozzle. For example, in some such embodiments, the remote controller may signal to the base controller that the hose is charged and the nozzle is not substantially horizontal (e.g., +60/−30 degrees). In response, a signal may be generated indicating an error in the hose line or signaling an operator to check the hose line. In other embodiments, a hose line may be charged via a predefined motion or a combination of predefined motions, such as for example, three quick, successive, 90° jerks to the left that are detected by the sensor.

In some embodiments, a wireless radio transmitter or hardwired communication line in the nozzle may communicatively couple a remote controller in the nozzle to the fire truck and/or to the base component located at the fire truck. The sensor signal can be used to automatically adjust the nozzle fluid flow and/or pressure by selectively adjusting the discharge valve that controls flow through the nozzle. Furthermore, in some embodiments, fluid flow through the nozzle may be measured by the sensor based on vibrations generated by the flow and detected by the sensor as fluid flows through the nozzle. For example, in embodiments where the sensor is an accelerometer, the accelerometer may detect minute vibrations in the nozzle generated by the fluid flow. Moreover, the remote controller may apply a smoothing function to the readings from the accelerometer to enable an approximate fluid flow measurement based on the detected minute vibrations. Some of the embodiments described herein provide advantages over some known systems in that they may automate the detection and reaction to both intentional and unintentional nozzle deployment. Moreover responsiveness and safety to the operation of the fire truck are facilitated to be improved, thus decreasing reaction time to deployment events.

In some embodiments, the above-described sensor or other systems may be used to trigger an automatic nozzle shutoff. For example, in some embodiments, a Deadman-like switch is provided at a grip on the nozzle. If the Deadman switch is released, a timer may be triggered which causes a short delay before the fluid is turned off. Such embodiments enable an operator to switch hands or to re-position themselves without losing flow. The fluid flow from the nozzle can be selectively turned off using a solenoid that biases a spring which, when triggered will close the handle and shut off the fluid supply. In some embodiments, under normal operations the spring does not impede operation of the nozzle as it is biased by the solenoid.

In alternative embodiments, a sensor (e.g., an accelerometer) in the nozzle detects whether fluid is flowing based on a position of the handle and a determination of whether the nozzle is moving erratically. In response to the sensor detecting such motion, a solenoid or motor may be activated causing the nozzle valve to close. Programming of the remote controller and/or base controller can be accomplished with hysteresis to prevent oscillations and to enable a determination of whether the firefighter is using the nozzle to poke holes in a wall or break glass or doors, rather than determining that the nozzle is loose and/or it was a false trigger.

In the embodiments described herein, communication between nozzle and its associated components, and the fire truck and its associated components, may be achieved via wired or wireless communication. For example, in some embodiments, optical cables extend between the nozzles and the fire truck. Alternatively, twisted wire, co-axial cable, HDMI cable, and/or flat wire mesh (including plastic coated wire mesh) may be used. In some embodiments, the wire may extend through a passageway of the hose for carrying fluid and/or may be embedded within the hose jacket. Alternatively, the wire may be wrapped around the exterior of the hose. Moreover, in some embodiments, communication between the nozzle and fire truck may be achieved via a combination of wireless and wired communication. For example, in some embodiments, transmitters and receivers are coupled to and spaced along the length of the hose line to facilitate reducing wireless transmission length (commonly 50' hose lengths, for example) to a more reliable distance and to allow communications to be transmitted past typical hose connections such as swivel, storz, etc., without requiring wired connections between individual hose lengths. Wired connections could potentially be contained/protected in the hose to connect one transmitter/receiver at one hose end to another transmitter/receiver at the other end. In some embodiments, a wire is embedded in the hose to function as a radio antenna for wireless data communications from the nozzle to the system/base controller on the fire truck. In some such embodiments, the loosely coupled antenna boosts the signal into and out of structures where wireless signals may otherwise be attenuated by the construction of the structure (e.g. sheet metal buildings). In some embodiments, communication between the nozzle and valve is achieved via sonar or ultrasound transmissions through a fluid in the hose line. In further embodiments, a wireless transmission mesh network may be established by providing transceiver nodes on the firefighters' equipment/clothing. In some such embodiments, the remote controller may be located on the firefighters' equipment/clothing and/or a firefighter may control operation of the valve via a control on their clothing/other equipment.

In some embodiments described herein, the fire-fighting control systems include a sensor for determining whether a hose is located within a hose storage compartment on the fire truck. For example, in some embodiments an electrical or mechanical sensor is coupled in a hose bed of the fire truck.

The sensor communicates with a base controller at the truck, to facilitate preventing the opening of the hose bed control valve/discharge valve when the hose is in a stored or packed condition and, as such, prevents the line from being charged. In some such embodiments, only when the sensor detects that the hose has been removed from the storage compartment, is the discharge valve permitted to open to enable the hose to be charged, such that inadvertent pressurization of a packed or stored hose is facilitated to be prevented.

In some embodiments, the remote controller, the base controller, and/or an operator proximity assembly may determine that a firefighter has been separated from their nozzle and in response, may trigger a beacon/alert. For example, in some embodiments, when it is detected that a firefighter has become separated from their nozzle, a remote controller transmits a signal to a base controller, which in turn transmits a response signal to the remote controller/nozzle to increase or decrease an intensity of the LED, and/or LED blinking, thereby making the nozzle more visible and easier for the firefighter to find the hose line which can be used to help the firefighter exit a structure if necessary. In some such embodiments, the nozzle may include a clear cover plate and/or a display plate that permits the LED light to shine through the top, as well as along the edges of the plate, thus making the nozzle LED more visible about a circumference of the nozzle. In other embodiments, the beacon may also include an audible system.

The exemplary systems and methods described herein overcome disadvantages of known fire-fighting control systems by enabling automated control of safety components of a fire-fighting system. For example, some embodiments described herein enable control of fire-fighting system components based on detected movement of the nozzle or based on a detected proximity of the nozzle to a firefighter (e.g., a nozzleman). Accordingly, the systems described herein improve firefighter safety by automatically triggering emergency procedures when a firefighter is incapacitated or becomes separated from their nozzle. Additionally, some embodiments described herein allow for improved control of fluid flow by controlling components of a pumper truck based on a sensed pressure at the nozzle and reverting to a sensed pressure in the line, at the truck, when communication with the nozzle is lost. Furthermore, some embodiments described herein enable automated control of charging a hose line when the hose line is substantially removed from a storage compartment of the pumper truck. As a result, the systems and methods described herein facilitate increasing the efficiency of the fire-fighting control system in a cost-effective and reliable manner, while also improving firefighter safety.

Figure 2:
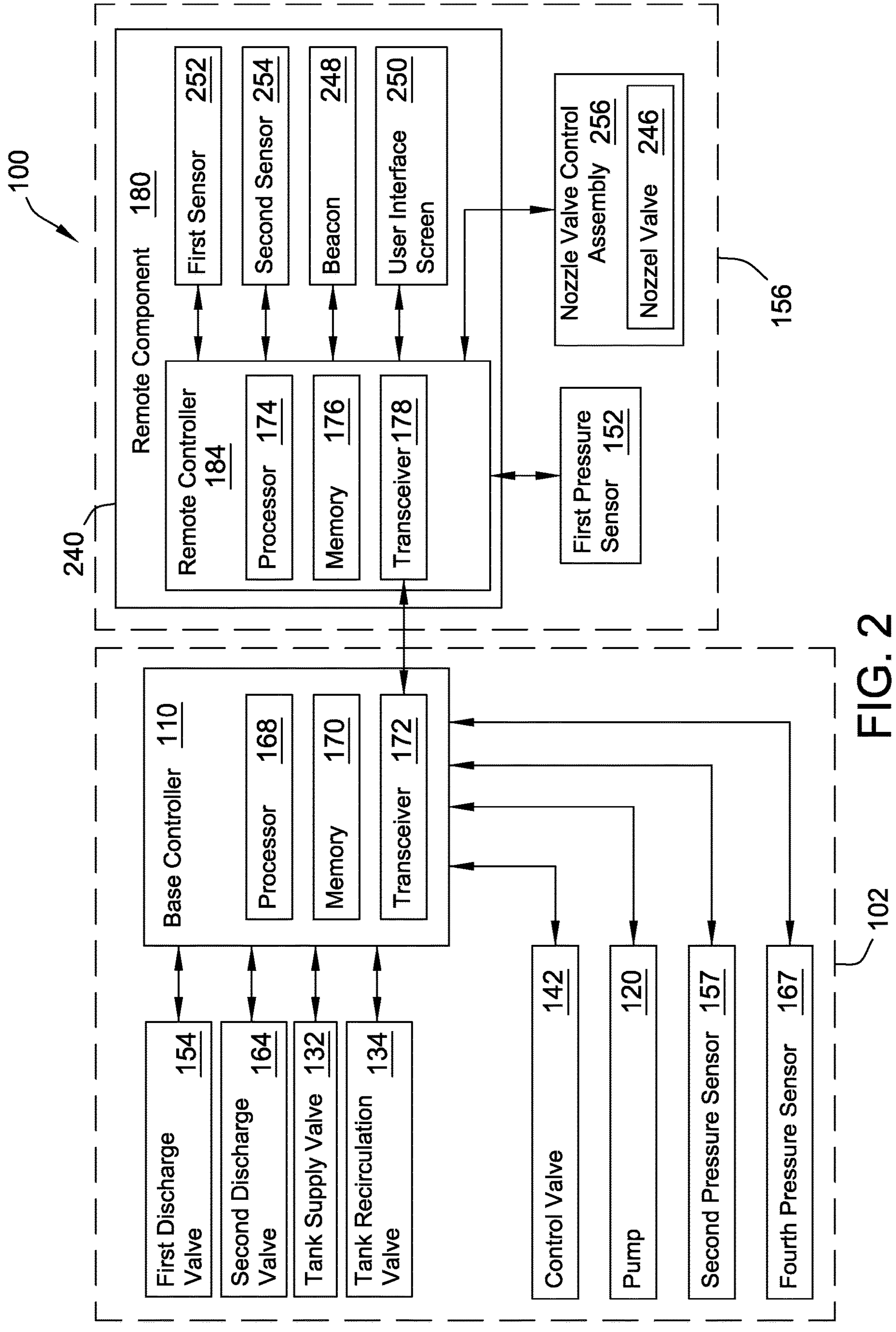
FIG. 2 is a schematic view of a portion of the fire-fighting system shown in FIG. 1.

FIG. 1 is a schematic view of an exemplary fire-fighting control system 100. FIG. 2 is a schematic view of a portion of fire-fighting system 100. In the exemplary embodiment, control system 100 includes a base controller 110 that is coupled via a communication link 112 to a pump 120. A tank 130 and a fluid source 140 are also coupled to pump 120. A remote component 180 is wirelessly coupled to base controller 110. More specifically, as shown in FIG. 2, in the exemplary embodiment, remote component 180 includes a remote controller 184 including a transceiver 178 which wirelessly transmits and receives signals from a transceiver 172 of base controller 110. In other embodiments, remote component 180 is wirelessly or otherwise coupled to other components (e.g., via light towers, generators, scene lights, winches, cable reels, rescue tools, and/or any other electrically, hydraulically, or pneumatically controlled piece of equipment used in fire-fighting or rescue operations) in the fire-fighting device 102 to control their operation as well.

In the exemplary embodiment, base controller 110, tank 130, and pump 120 are each coupled to a fire-fighting device 102, such as a fire truck, used in system 100. In other embodiments, any of base controller 110, tank 130, and/or pump 120 may not be coupled to fire-fighting device 102. Fluid for fighting or suppressing a fire is stored in tank 130. In the exemplary embodiment, the fluid is water. In other embodiments, any other fluid, such as a foam-like substance or other flame retardant, may be contained in tank 130. Tank 130 is coupled via a tank supply line 138 to pump 120 to enable fluid to be selectively supplied to pump 120. A tank supply valve 134 coupled to tank supply line 138 provides control of a flow of fluid from tank 130 to pump 120. A tank recirculation line 136 enables fluid to be recirculated from pump 120 to tank 130. A tank recirculation valve 132 coupled to tank recirculation line 136 provides control of a flow of fluid from pump 120 to tank 130.

A fluid source 140 is coupled to pump 120 via a source line 146. A control valve 142 is coupled to source line 146 to facilitate control of the flow of fluid from fluid source 140 to pump 120. In alternative embodiments, a pressure sensor (not shown) is coupled to source line 146 to measure an operating pressure of fluid in source line 146. In the exemplary embodiment, the fluid discharged from fluid source 140 is water. In other embodiments, the fluid discharged from source 140 may be any other fluid such as, but not limited to, a foam-like substance or any other flame-retardant fluid. In the exemplary embodiment, fluid source 140 is a continuous fluid source embodied as a fire hydrant. In other embodiments, fluid source 140 may be any other source of fluid, such as a river, lake, or any other body of water. In the exemplary embodiment, pump 120 is operable to selectively fill tank 130 with fluid from fluid source 140.

A first nozzle 156 is coupled to pump 120 via a first hose line 150. A first discharge valve 154 coupled to line 150 selectively controls a flow of fluid from pump 120 to first nozzle 156. A first pressure sensor 152 is coupled to first hose line 150 proximate nozzle 156 to measure an operating pressure of fluid flowing through first hose line 150 at the first nozzle 156 (e.g., within or immediately adjacent to first nozzle 156). More specifically, in the exemplary embodiment, first pressure sensor 152 is securely coupled to first nozzle 156 to measure the pressure of fluid entering first nozzle 156. A second pressure sensor 157 is coupled to first hose line 150 adjacent to first discharge valve 154 to measure an operating pressure of fluid flowing through first hose line 150 at first discharge valve 154 (e.g., within, or immediately adjacent to first discharge valve 154). More specifically, in the exemplary embodiment, second pressure sensor 157 is securely coupled to first hose line 150 to measure the pressure of fluid within first hose line adjacent to first discharge valve 154. In alternative embodiments, second pressure sensor 157 is securely coupled to first discharge valve 154 to measure fluid pressure within first discharge valve 154.

A second nozzle 166 is coupled to pump 120 via a second hose line 160. In the exemplary embodiment, nozzles 156 and 166 are identical. In other embodiments nozzle 156 is different than nozzle 166. A second discharge valve 164 coupled to line 160 controls a flow of fluid from pump 120 to second nozzle 166. A third pressure sensor 162 coupled to second hose line 160 proximate second nozzle 166 measures an operating pressure of fluid in second hose line 150 adjacent to second nozzle 156. A fourth pressure sensor 167 coupled to line 160 proximate second discharge valve 164 measures the operating pressure of fluid in second hose line 160. Sensors 162 and 167, in the exemplary embodiment, each operate substantially the same manner as described above with respect to first pressure sensor 152 and second pressure sensor 157, respectively. Although only two hose lines 150 and 160 are illustrated, it should be understood that in other embodiments, more or less than two hose lines and associated valves, nozzles, and pressure sensors may be used. First nozzle 156 and/or second nozzle 166 may be carried by, and/or selectively positioned by firefighters. In the exemplary embodiment, pressure sensors 152, 162, 157, and 167, are all transducers. In alternative embodiments, pressure sensors 152, 162, 157, and 167 each measure flow rates of fluid in system 100. In further alternative embodiments, pressure sensors 152, 162, 157, and/or 167 may be any sensor that enables system 100 to function as described herein.

Referring to FIG. 2, in the exemplary embodiment, base controller 110 and remote controller 184 may each generally be, or may include, any suitable computer and/or other processing unit, including, but not limited to, any suitable combination of computers, processing units, and/or the like, that may be operated independently, or in connection within, one another. In the exemplary embodiment, base controller 110 includes at least one processor 168 and an associated memory 170 configured to perform a variety of computer-implemented functions (e.g., performing the determinations, and functions disclosed herein). Likewise, remote controller 184 includes at least one processor 174 and an associated memory 176. As used herein, the term "processor" refers not only to integrated circuits, but also refers to a controller, a microcontroller, a microcomputer, a programmable logic controller (PLC), an application specific integrated circuit, and other programmable circuits. Additionally, memory device(s) 170 and 176 of base controller 110 and/or remote controller 184 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 170, 176 may generally be configured to store suitable computer-readable instructions that, when implemented by the respective processors, configure or cause base controller 110 and/or remote controller 184 to perform various functions described herein including, but not limited to, transmit and receive signals from the other of the base controller 110 and remote controller 184, controlling an actuation state of valves, 132, 134, 142, 154, and/or 164, controlling a speed of pump 120, controlling various assemblies of remote component 180, as described in greater detail below, and/or various other suitable computer-implemented functions.

In the exemplary embodiment, first discharge valve 154, second discharge valve 164, tank supply valve 132, tank recirculation valve 134, and control valve 142 are each communicatively coupled to base controller 110 such that the operation of each valve is controlled by base controller 110. Moreover, each valve 132, 134, 142, 154, and 164 also includes at least one feedback sensor (not shown) that enables each valve 132, 134, 142, 154, and/or 164 to be continuously monitored, while each remains continuously communicatively coupled to base controller 110. Second pressure sensor 157 and fourth pressure sensor 167 are also each coupled to base controller 110 such that base controller 110 continuously monitors the output (i.e., an operating pressure) of each respective pressure sensor 157 and 167. In the exemplary embodiment, transceivers 172 and 178 enable data to be transmitted between base controller 110 and remote controller 184 in the form of wireless communications (e.g., radio frequency communications). Base controller 110 also wirelessly communicates the actuation state of valves 132, 134, 142, 154, and/or 164, operating pressures sensed by pressure sensors 152, and/or 162, and a rotational speed of pump 120, for example, to remote controller 184. In alternative embodiments, base controller 110 is wirelessly coupled to at least one valve 132, 134, 142, 154, and/or 164, and/or to pump 120, to second pressure sensor 157, and/or to fourth pressure sensor 167 via transceiver 172.

In other embodiments, remote controller 184 is communicatively coupled to base controller 110 via a wired connection (not shown) running along first hose line 150 between fire-fighting device 102 (shown in FIG. 1) and first nozzle 156. For example, in some alternative embodiments, at least one optical cable (not shown) transmits data between remote controller 184 and base controller 110. In other alternative embodiments, the wired connection (not shown) includes at least one of a twisted wire, a co-axial cable, an HDMI cable, and/or a flat wire mesh cable. In some further embodiments, the wired connection is encased within first hose line 150 (shown in FIG. 3). For example, and without limitation, in some such embodiments, the wired connection is contained within a jacket 151 in first hose line 150 and extends through a fluid passageway 153 defined within first hose line 150.

In further alternative embodiments, remote controller 184 is communicatively coupled to base controller 110 via any combination of wired and wireless connections. For example, in some embodiments, a plurality of transceivers and/or repeaters, broadly referred to herein as "nodes" (not shown), may be mounted along the length of first hose line 150. For example, the nodes may be mounted to jacket 151 of first hose line 150 and/or mounted on fittings (not shown) connecting portions of first hose line 150. In such embodiments, power may be provided to the nodes via a wired power line running within first hose line 150, as described above. Moreover, in some embodiments, the wired connection on hose line 150 may function as an antenna for wireless data communications from remote controller 184 to base controller 110 (shown in FIG. 1). In alternative embodiments, the nodes may be coupled to first hose line 150 such that the nodes are configured to generate power from the flow of fluid within first hose line. For example, at least one of the nodes may be electrically coupled to a power generation device, such as a turbine and/or a piezoelectric element, extending within fluid passageway 153. The power generation device may be configured to convert mechanical energy of the fluid flow into electrical energy for powering the nodes. In such embodiments, the nodes may further include a battery for storing power generated by the turbines.

The above described nodes may facilitate boosting a wireless radio signal, in instances where, for example, there is significant structural interference (e.g., thick building walls) between remote component 180 and base controller 110. In other alternative embodiments, the nodes may be coupled within system 100 and/or to equipment carried by firefighters to facilitate establishing a mesh wireless network between remote controller 184 and base controller 110.

When communicating with base controller 110, transceiver 178 transmits a unique identifier with each wireless transmission. The identifier associates remote controller 184 with first nozzle 156 and enables base controller 110 to identify the communications received from remote controller 184 as being associated with first nozzle 156. Similarly, any other remote component 180 associated with second nozzle 166 also transmits a unique identifier in each wireless transmission with base controller 110. Prior to operation of system 100, in the exemplary embodiment, each remote component 180 may be automatically associated with its respective nozzle as each component is inserted in a specific charging cradle. For example, a charging cradle may be provided for each nozzle 156 and/or 166 and placement of a remote component 180 in a respective charging cradle automatically associates that remote component 180, and the associated remote controller 184, with only one nozzle 156 and/or 166. In another embodiment, remote component 180 may be associated with a respective nozzle 156 and/or 166 via a control or switch on remote component 180. In an alternative embodiment, each remote controller 184 may communicate with base controller 110 on different channels or frequencies that are each unique to only one remote controller 184.

Similarly, communications transmitted by base controller 110 to each remote controller 184 also each include a unique identifier that enables each remote controller 184 to identify whether it is the intended recipient of the communication. In another embodiment, base controller 110 does not transmit a unique identifier with each communication, but rather transmits communications to each remote controller 184 on a different channel or frequency that is unique to each remote controller 184 used.

In the exemplary embodiment, remote component 180 includes a locator beacon 248, a user-interface screen 250, a first sensor 252, and a second sensor 254, that are each in communication with remote controller 184. In alternative embodiments, any one of locator beacon 248, user inter-face screen 250, first sensor 252, and second sensor 254 may not be included within remote component 180 and may instead may be independently coupled to nozzle body 238 (shown in FIG. 3) in communication with remote controller 184. In alternative embodiments, remote component 180 may also include a microphone to enable a firefighter to transmit voice messages to base controller 110 and/or to control remote controller 184 using voice commands. In further alternative embodiments, remote component 180 includes a biometric scanner (e.g., a fingerprint scanner and/or retinal scanner) to enable control of remote component 180.

Figure 3:
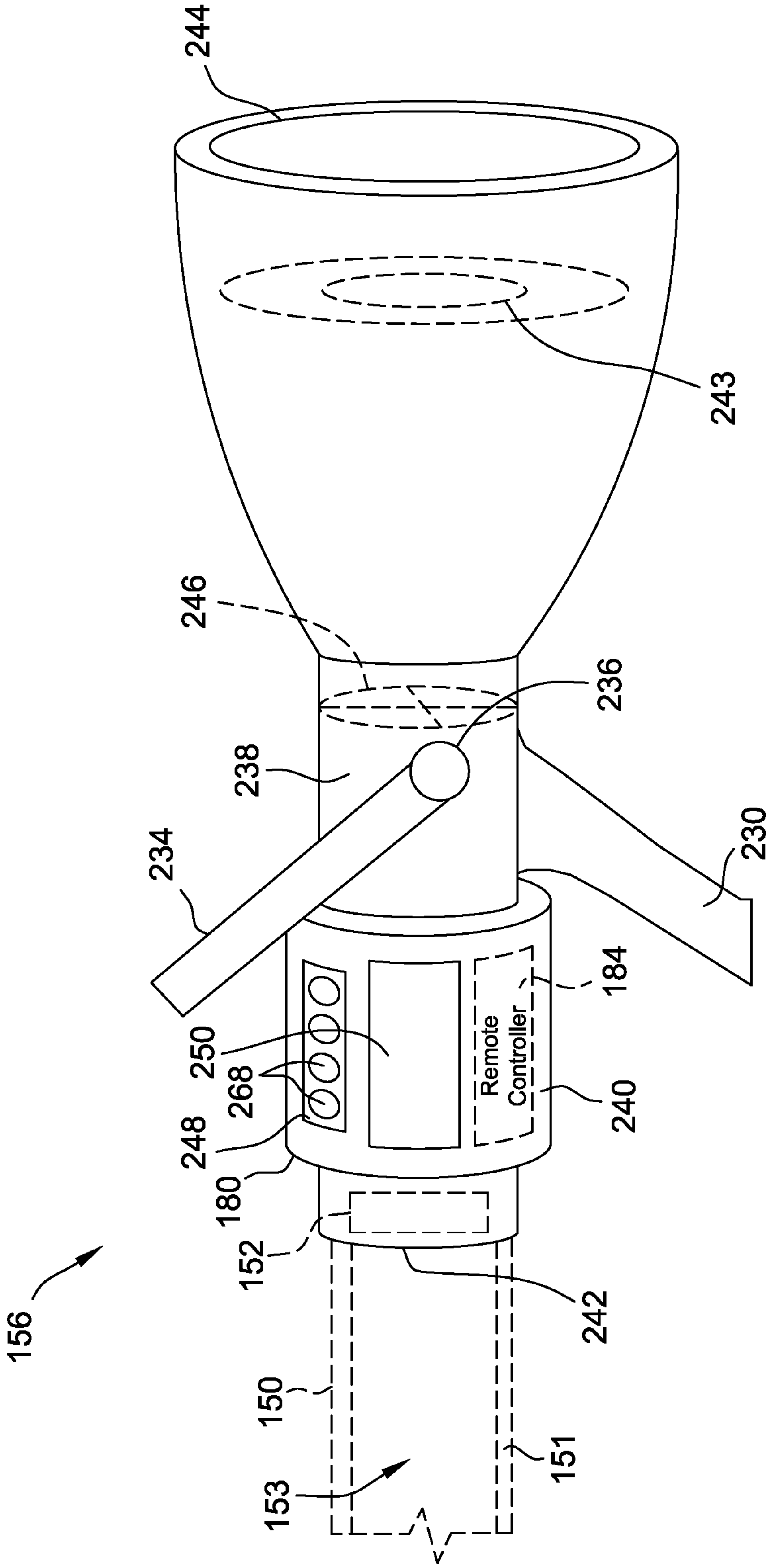
FIG. 3 is a side view of an exemplary nozzle suitable for use with the fire-fighting system of FIG. 1.

FIG. 3 is a side view of an exemplary nozzle 156 that may be used with the fire-fighting system 100 (shown in FIG. 1). In the exemplary embodiment, nozzle 156 includes a nozzle handle 230 that is coupled to a nozzle body 238. Nozzle body 238 includes a fluid passage (not shown) defined therein that extends laterally between an inlet 242 and an outlet 244 of nozzle body 238. A bail 234 is coupled to nozzle body 238 to enable the position of a nozzle valve 246 (shown in phantom) to be controlled relative to nozzle body 238. Movement of bail 234 regulates the flow of fluid from nozzle outlet 244. More particularly, nozzle valve 246 may be controllable by pivoting bail 234 to a closed position (not shown) in which fluid flow between inlet 242 and outlet 244 is prevented, or by pivoting bail 234 to an open position (shown in FIG. 3) in which fluid is permitted to flow to outlet 244. A bail position sensor 236 communicates the relative position of bail 234 to remote component 180, or, more specifically, to remote controller 184.

In the exemplary embodiment, first nozzle 156 is fabricated from a heat-resistant material or materials, such as, but not limited to, anodized aluminum or any other type of aluminum, and includes a nylon valve body. A rechargeable battery (not shown) is coupled to nozzle body 238 such that the battery is electrically coupled to remote component 180. In other embodiments, a rechargeable battery may be positioned external to nozzle body 238, such as within remote component 180. In the exemplary embodiment, the rechargeable battery is recharged when either remote component 180 or nozzle body 238 is positioned in a charging cradle (not shown). Alternatively, the rechargeable battery may be removed from nozzle body 238 and be independently positioned in the charging cradle to be recharged.

In the exemplary embodiment, remote component 180 is securely coupled to nozzle body 238. More specifically, in the exemplary embodiment, remote component 180 includes a housing 240 that is fixed to nozzle body 238. In other embodiments, remote component 180 may be integrally formed with nozzle body 238. In further embodiments, remote component 180 may be removably coupled to nozzle body 238 and is exchangeable such that remote component 180 may be removably coupled to alternative nozzles (not shown) and/or worn or carried by a firefighter.

In the exemplary embodiment, screen 250 of remote component 180 displays various selectors and/or controls (not shown) that may be variably selected to facilitate control and operation of system 100. More specifically, in the exemplary embodiment, screen 250 displays controls that enable control of the operating pressure in first hose line 150, second hose line 160, and/or any other hose lines included in system 100. Screen 250 also provides a visual indication of the actual pressure in first hose line 150, second hose line 160, and/or any other hose lines (not shown) in system 100. Screen may also provide a visual indicator of the current operative condition of valves 132, 134, 142, 154, and/or 164 in system 100. Moreover, in some embodiments, remote component 180 may also include audio and/or graphical displays that may be activated in response to receiving signals from base controller 110. For example, remote component 180 may display warning messages communicated from base controller 110. In other embodiments, remote component 180 may also display a colored light (e.g., a green light) that indicates when system 100 is ready to provide fluid to first nozzle 156 and/or second nozzle 166. Remote component 180 may also illuminate a second colored light (e.g., a red light) when system 100 is in a predetermined operational status or when specific controls are not ready for actuation on remote component 180. Remote component 180 may also include other visual and/or audible indicators such as, but not limited to, an LED fluid level indicator and/or warning indicator(s).

In the exemplary embodiment, screen 250 may also enable control of valves 132, 134, 142, 154 and/or 164, and/or operation of pump 120. More specifically, in the exemplary embodiment, screen 250 is a touch sensitive screen 250 that overlays a graphical display. Accordingly, in the exemplary embodiment, remote controller 184 may be operated by a user by pressing on predetermined locations defined on screen 250. For example, and without limitation, screen 250 may display an operating parameter (e.g., fluid pressure, flow rate, etc.) of fluid flow through nozzle 156 and may receive a user-requested fluid flow parameter (e.g., pressure, absolute flow rate, relative flow rate, etc.). In the exemplary embodiment, screen 250 is an auto-dimming touchscreen that requires a user to purposely swipe it to access a line charge button (i.e., to transmit a command to open a specific discharge valve 154 and/or 164). In the exemplary embodiment, any and/or all of the controls may be selectively controllable by a firefighter via remote controller 184. Moreover, remote controller 184 also communicates the relative position of bail 234 to other components of system 100.

In the exemplary embodiment, first nozzle includes a baffle 243 operable to control a spread or "nozzle pattern" of fluid flow from outlet 244. For example, first nozzle 156 may also include a bumper (not labeled in FIG. 3) that is rotatable by a firefighter (e.g., a nozzleman) to adjust the spread of a spray of fluid exiting outlet 244 between a dispersed spray pattern (also referred to as a "fog" pattern) and a concentrated spray or straight stream. In alternative embodiments, baffle 243 is operable to control the spread of fluid to exit radially from outlet 244 about the circumference of outlet. In other words, in such embodiments, baffle 243 may control fluid flow to exit nozzle 156 at a direction oriented approximately 180 degrees relative to outlet 244. In the exemplary embodiment, baffle 243 further includes an actuator (not shown), such as, for example and without limitation, a motor. The actuator may be coupled in communication with remote controller 184, thereby enabling remote controller 184 to control the spread of fluid flow from first nozzle 156.

In the exemplary embodiment, base controller 110 is operable to control operation of system 100 based on communications received from remote controller 184, the sensed state of valves 132, 134, 142, 154, and/or 164, and the operating pressures sensed by pressure sensors 152, 162, 157, and/or 167 (collectively referred to as "inputs"). Based on inputs received by base controller 110, base controller 110 determines, based on predefined logic and/or based on a set of predefined rules (the two terms are referred to herein interchangeably) stored in the memory 170, control operation of system 100. The set of rules broadly define the conditions and/or operating limitations for system 100. For example, the predefined logic may indicate maximum operating pressures for hose lines 150 and/or 160, a maximum or minimum operating speed of pump 120, a maximum or minimum operating pressure in source line 146, and/or a maximum or minimum amount of fluid to be maintained in tank 130. Such rules may also define the operational responses of base controller 110 for system 100, based on inputs to system 100.

For example, when base controller 110 receives a communication from a remote controller 184 associated with first nozzle 156 demanding an increase in fluid pressure in first hose line 150, base controller 110 controls operation of system 100 based on the predefined logic. In such an example, the set of rules may cause first discharge valve 154 to be opened until a desired operating pressure is sensed by first pressure sensor 152. In the exemplary embodiment, measured operating values fall within a predefined tolerance (e.g., ±5 psi). For example, the desired operating pressure may include a user-requested operating pressure, or a preset pressure stored in memory 176 of remote controller 184. If the desired pressure is not attained, base controller 110 causes the operating speed of pump 120 to increase until the desired operating pressure is sensed by first pressure sensor 152.

In another example, base controller 110 may receive a communication from remote controller 184 associated with first nozzle 156 requesting that fluid flow to first nozzle 156 be ceased. In response, base controller 110 controls operation of system 100 based on inputs received and based on predefined logic. The predefined logic causes first discharge valve 154 to close after receiving such a communication from remote controller 184 and to reduce the operating speed of pump 120 such that the operating pressure sensed by third pressure sensor 162 at second nozzle 166 remains substantially constant as fluid is being pumped through second hose line 160. Additionally or alternatively, the predefined logic may cause an additional valve at firefighting device 102 (e.g., a relief valve) coupled in flow communication with pump 120 to open to reduce the discharge pressure of the pump 120 without changing the operating speed of pump 120. If fluid is not being channeled through second hose line 160, the operating speed of pump 120 is reduced to idle, and tank recirculating valve 132 and tank supply valve 134 are each opened to enable fluid to be recirculated through tank 130. The predefined logic may also cause source valve 142 to close after a level of fluid in tank 130 has reached a predefined threshold (e.g., a predefined capacity of tank 130).

In the exemplary embodiment, first sensor 252 is coupled to first nozzle 156 and is communicatively coupled to remote controller 184. More specifically, in the exemplary embodiment, first sensor 252 is positioned within remote component 180. First sensor 252 detects movement of first nozzle 156, or more specifically, of first nozzle body 238, and generates a signal indicative of the detected movement. For example, in the exemplary embodiment, first sensor 252 is an accelerometer that detects motion and an orientation of first nozzle 156. In alternative embodiments, first sensor 252 may be any other sensor that enables remote component 180 to function as described herein. For example, and without limitation, in some alternative embodiments, first sensor 252 may be, but is not limited to being a gyroscope, an infra-red sensor, an ultrasonic sensor, and/or a microwave sensor.

In the exemplary embodiment, at least one of remote controller 184 and/or base controller 110 controls fluid flow to first nozzle 156 and/or fluid flow from first nozzle 156 based on a detection by first sensor 252. More specifically, first sensor 252 generates a signal indicative of detected motion of first nozzle 156, and either remote controller 184 and/or base controller 110 compares the received signal to a predetermined threshold to determine if the threshold has been exceeded. An operational status of first discharge valve 154, pump 120, and/or nozzle valve 246 may be changed based on the determination. More specifically, in one example, remote controller 184 may transmit readings from first sensor 252 to base controller 110. Base controller 110 may determine whether the readings from first sensor 252 exceed a predetermined threshold. For example, the predetermined threshold may indicate that either remote component 180 and/or first nozzle 156 is moving erratically (thereby indicating that the firefighter has dropped or otherwise lost control of first nozzle 156). Additionally or alternatively, base controller 110 may determine whether readings from first sensor 252 indicate that nozzle 256 has not been moved. For example, after determining that the sensed movement exceeds a predetermined threshold, base controller 110 may cause first discharge valve 154 to close, control pump 120 to operate at a reduced speed, cease operation of pump 120, and/or may close nozzle valve 246. More specifically, in the exemplary embodiment, remote controller 184 is communicatively coupled to a nozzle valve control assembly 256 that controls operation of nozzle valve 246. In alternative embodiments, when system 100 does not include base controller 110, remote controller 184 transmits a signal directly to a valve controller (not shown) associated with first discharge valve 154 to cause first discharge valve 154 to close based on the detection by first sensor 252.

In the exemplary embodiment, in response to determining that the sensed movement exceeds the predetermined threshold, base controller 110 transmits a signal to remote controller 184 causing remote controller 184 to close nozzle valve 246, via nozzle valve control assembly 256. In alternative embodiments, after remote controller 184 determines the sensed movement exceeds the predetermined threshold, nozzle valve control assembly 256 closes nozzle valve 246 in response. Moreover, in some embodiments, either remote controller 184 and/or base controller 110 generates and transmits an alert to other components of system 100, such as, for example, additional remote components (not shown) associated with additional firefighters and/or a general alert/display at fire-fighting device 102 to indicate that a firefighter associated with remote controller 184 has dropped or otherwise lost control of their nozzle.

In the exemplary embodiment, system 100 also controls first discharge valve 154, pump 120, and nozzle valve 246 based on an orientation of first nozzle 156 as detected by first sensor 252. For example, during operation, after opening first discharge valve 154, base controller 110 may close first discharge valve 154 and/or activate an alert (e.g., at first nozzle 156, second nozzle 166, and/or fire-fighting device 102) in response to receiving a signal from remote controller 184 indicating that remote component 180 is misaligned and its orientation is out of predetermined threshold bounds (e.g., not horizontally oriented +60/−30 degrees). Additionally, in some embodiments, components of system 100 may be controlled by distinct movements of the nozzle 156 and/or remote component 180 by the firefighter. For example, in some embodiments, three quick successive 90° twists may cause a signal to be transmitted from base controller 110 to cause the corresponding discharge valve 154 and/or 156 to open or close. Moreover, in the exemplary embodiment, base controller 110 and/or remote controller 184 may selectively permit fluid flow to and/or from first nozzle 156 in response to determining that a signal from the first sensor 252 has returned to being within predefined limits and after the firefighter has requested that fluid flow resume at nozzle (e.g., either via input at screen 250 or by adjusting a position of bail 234).

Figure 4:
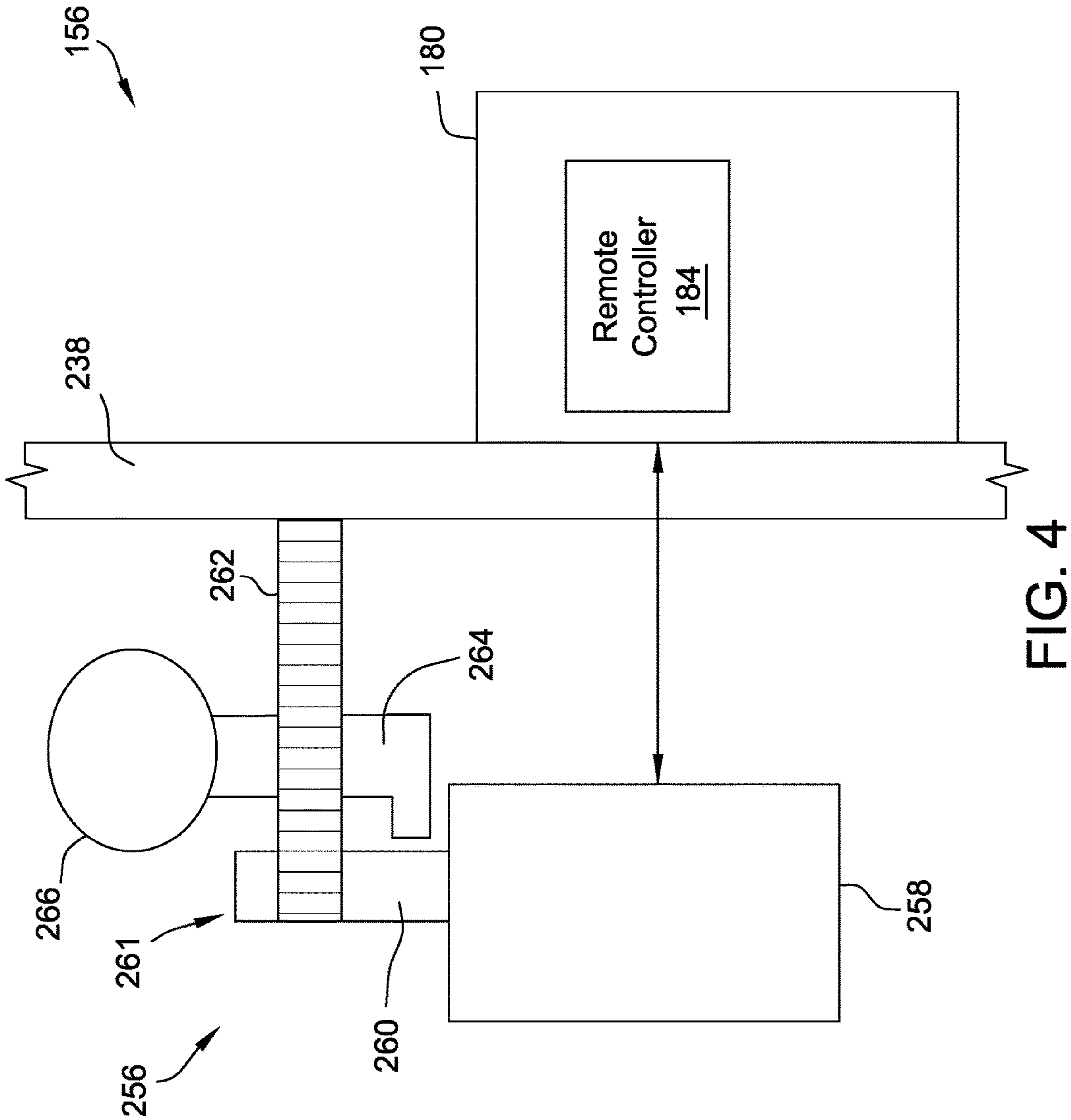
FIG. 4 is schematic view of an exemplary nozzle valve control assembly that may be used with the nozzle shown in FIG. 3.

FIG. 4 is schematic view of an exemplary nozzle valve control assembly 256 that may be used with nozzle 156 (shown in FIG. 3). In the exemplary embodiment, nozzle valve control assembly 256 selectively controls nozzle valve 246 (shown in FIG. 3) between the open and closed positions. More specifically, nozzle valve control assembly 256 includes a solenoid 258 communicatively coupled to remote controller 184 and to base controller 110. In the exemplary embodiment, solenoid 258 is electrically coupled to remote controller 184. Solenoid 258 includes a plunger 260 that is selectively moveable between a first position 261 (e.g., an extended position, as shown in FIG. 4) and a second position (e.g., a retracted position, not shown) based on a signal provided to solenoid 258. Nozzle valve control assembly 256 also includes a biasing element 262 coupled to nozzle body 238. In the exemplary embodiment, biasing element 262 is a spring. In alternative embodiments, biasing element 262 may be any other biasing element that enables nozzle valve control assembly 256 to function as described herein. An arm 264 extends from a hinge 266 of nozzle valve 246. Arm 264 rotates with hinge 266 such that rotational movement of arm 264 causes rotation of hinge 266 which causes nozzle valve 246 to move between the open and closed positions. Hinge 266 is also coupled to bail 234 (shown in FIG. 3) such that movement of bail 234 causes hinge 266 to rotate.

During operation, when plunger 260 is in the extended position 261 (as shown in FIG. 4), plunger 260 engages biasing element 262 and inhibits biasing element 262 from biasing arm 264. As a result, during normal operations, nozzle valve 246 may be selectively moved between the open and closed positions without interference and/or bias from biasing element 262. In the exemplary embodiment, when plunger 260 is moved to the retracted position (e.g., based on a signal from remote controller 184), biasing element 262 is released from plunger 260 and engages arm 264 to rotate hinge 266, and therefore biases nozzle valve 246 to the closed position. In alternative embodiments, nozzle valve control assembly 256 may include any control assembly that enables first nozzle 156 to function as described herein. For example, and without limitation, in some alternative embodiments, nozzle valve control assembly 256 includes a motor (not shown) which drives actuation and/or a position of nozzle valve 246.

In the exemplary embodiment, beacon 248 is coupled to housing 240. Beacon 248 outputs a visible signal when activated. More specifically, in the exemplary embodiment, beacon 248 includes a plurality of LEDs 268 that strobe when activated to assist a firefighter in locating first nozzle 156 during low visibility conditions. In alternative embodiments, beacon 248 also includes a speaker (not shown) in addition to/or rather than LEDs 268. In the exemplary embodiment, the audible level of the speaker may be preset to be audible at a distance of at least 100 yards, at least 50 yards, and/or at least 20 yards. Beacon 248 may be activated either via a user at base controller 110, a user at remote controller 184, or automatically by either remote controller 184 and/or base controller 110. In alternative embodiments, beacon 248 is coupled to nozzle body 238. In another embodiment, beacon 248 is formed integrally with nozzle body 238.

In the exemplary embodiment, remote component 180 also includes a second sensor 254 in communication with remote controller 184. Sensor 254 is positioned to detect that the firefighter is within a predefined distance of first nozzle 156. For example, in the exemplary embodiment second sensor 254 detects that a firefighter is within a predefined sensor range of second sensor 254. The sensor range may be based on predetermined instructions stored in memory 176 and/or may be based on a physical range capacity of second sensor 254. More specifically, in the exemplary embodiment, second sensor 254 includes a radio frequency identification (RFID) reader located within housing 240. An RFID tag may be worn or embedded into the clothing of the firefighter. In alternative embodiments, the RFID reader may be embedded into clothing and/or otherwise carried by firefighter and the RFID tag may be located within housing 240 of remote component 180. In alternative embodiments, second sensor 254 can detect a distance between the firefighter and the first nozzle 156. For example, in some embodiments, second sensor 254 includes at least one of a GPS sensor, an infrared sensor, and/or a similar sensor. In further alternative embodiments, second sensor 254 includes any other sensor that enables remote component 180 to operate as described herein.

In the exemplary embodiment, remote component 180 (broadly, an operator proximity assembly) detects whether a firefighter has become separated from first nozzle 238 based on readings from at least one of second sensor 254 and/or first sensor 252. More specifically, as described above, remote controller 184 may determine that a firefighter has become separated from first nozzle 156 based on a detection from first sensor 252 indicating erratic movement of first nozzle 156 or that first nozzle 156 is positioned at an orientation that exceeds a predefined orientation range. Additionally, or alternatively, remote controller 184 may determine that a firefighter has become separated from first nozzle 156 based on a detection from first sensor 252 indicating a lack of movement of first nozzle 156 for a predetermined time period. For example, in some embodiments, at least one of base controller 110 and remote controller 184 may store at least one predetermined time period and a minimum detected movement threshold. In some such embodiments, when readings from first sensor 252 indicate that the movement of first nozzle 156 is less than the minimum detected movement threshold, remote controller 184 begins a countdown of a first predetermined time period. After the countdown of the first predetermined time period has expired, remote controller 184 may generate at least one of an audible and visual alert (e.g., via beacon 248 and/or screen 250), indicating to a firefighter that that the remote controller 184 has determined that there has been a lack of movement of first nozzle 156. If no further action is taken by the firefighter, for example, by either dismissing the alert at screen 250 and/or moving first nozzle 156 above the minimum detected movement threshold, remote controller 184 may determine that the firefighter has become separated from first nozzle 156. Additionally, or alternatively, remote controller 184 may determine that the firefighter has become separated from first nozzle 156 based on a detection from second sensor 254 indicating that a distance between the firefighter and first nozzle 156 exceeds a predetermined threshold.

In some embodiments, remote controller 184 may communicate with base controller 110 and/or nozzle valve control assembly 256 to determine whether the firefighter has become separated from first nozzle 156. For example, where first sensor 252 indicates that the detected movement of first nozzle 156 exceeds the predetermined threshold, remote controller 184 may first determine that at least one of first discharge valve 154 and nozzle valve 246 are open, thereby indicating that that the erratic movement is caused by loose fluid flow from first nozzle 156, in order to determine whether the firefighter has become separated from first nozzle 156. Additionally or alternatively, where first sensor 252 indicates that the detected movement of first nozzle 156 is less than the minimum detected movement threshold, remote controller 184 may first determine that first discharge valve 154 is open and/or nozzle valve 246 is closed, thereby indicating that that the first nozzle 156 is active (i.e., not in storage) and that lack of movement of first nozzle 156 is likely caused by separation of the firefighter from first nozzle 156.

In response to determining that the firefighter has become separated from first nozzle 156, in the exemplary embodiment, remote controller 184 activates beacon 248. Remote controller 184 may also transmit an alert to base controller 110 and/or to other remote components associated with additional firefighters in response to determining that a firefighter has become separated from first nozzle 156. Additionally, or alternatively, in some embodiments, at least one of nozzle valve 246 and first discharge valve 154 may be closed to cease fluid flow to and/or from first nozzle 156 in response to the firefighter becoming separated from first nozzle 156. For example, in some such embodiments, in response to determining that the firefighter is separated from first nozzle 156, remote controller 184 transmits a signal to nozzle valve control assembly 256 causing nozzle valve 246 to close. Moreover, remote controller 184 may transmit a signal to base controller 110 causing base controller to close first discharge valve 154. Additionally, or alternatively, remote controller 184 may control baffle 243 to change the nozzle pattern of fluid emitted by first nozzle 156. For example, remote controller 184 may control baffle 243 to change the nozzle pattern from a concentrated flow or straight stream to a dispersed fluid flow (e.g., a mist or fog pattern). In such embodiments, controlling baffle 243 to change the nozzle pattern in response to determining that the firefighter (e.g., a nozzleman) has become separated from first nozzle 156 reduces a net force from the fluid acting on first nozzle 156, thereby decreasing erratic movement of the nozzle and allowing the nozzleman to regain control of the nozzle. Additionally, changing the nozzle pattern of fluid emitted from first nozzle 156, as compared to cutting or reducing fluid flow from nozzle, provides continued fluid flow from nozzle and provides additional safety to the firefighter as they regain control of nozzle.

In alternative embodiments, the operator proximity assembly is a mechanical assembly. For example, in some embodiments, first nozzle 156 includes a switch (e.g., a Deadman's switch, not shown) that is engaged by the firefighter as the firefighter holds first nozzle 156. In some such embodiments, when the firefighter becomes separated from first nozzle 156, the switch is disengaged, and beacon 248 is activated in response. For example, in some such embodiments, the switch is electrically coupled to beacon 248. In further alternative embodiments, the switch may be coupled in communication with remote controller 184 and remote controller 184 activates beacon 248 in response to the switch being disengaged. In at least some such embodiments, beacon 248 is activated in response to the switch being disengaged and after a predetermined time period has lapsed since the switch was disengaged. For example, in such embodiments, remote controller 184 facilitates preventing triggering of beacon 248 when, for example, a firefighter disengages the switch when repositioning nozzle 156. In some embodiments, when the switch is disengaged and, optionally, after a predetermined time period has lapsed since the switch was disengaged, remote controller 184 transmits a signal to nozzle valve control assembly 256 causing nozzle valve 246 to close. In alternative embodiments, first nozzle 156 includes a timer (not shown) coupled to the switch. In response to the switch being disengaged, the timer may begin a countdown of the predetermined time period. In such embodiments, in response to the countdown being completed beacon 248 may be activated and/or nozzle valve control assembly 256 may cause nozzle valve 246 to close.

As described above, in the exemplary embodiment, during a normal operating condition, remote controller 184 transmits operating pressures sensed by first pressure sensor 152 to base controller 110. Base controller 110 may then control valves 132, 134, 142, 154, and/or 164 and pump 120 such that the operating pressures sensed by first pressure sensor 152 correspond to user-requested operating pressures (e.g., received at user interface screen 250), or preset pressures (e.g., stored in the memory 176). That is, during normal operation, base controller 110 controls system 100 by comparing user requested operating pressures or preset operating pressures associated with the respective nozzles 156 and 166 to the pressures sensed at the pressure sensors 152 and 162 located nearest nozzles 156 and 166.

In the exemplary embodiment, base controller 110 is further configured to control system 100 by comparing the pressures sensed at the pressure sensors 157 and 167 located at the firefighting device 102 with the pressures sensed at the pressure sensors 152 and 162. For example, in some embodiments, memory 170 of base controller 110 stores a machine learning algorithm configured to continuously model pressure differentials between pressures sensed at pressure sensors 157 and 167 with the pressures sensed at the corresponding pressure sensors 152 and 162. For example, during a first operation, a user may request a desired fluid pressure (i.e., a first pressure) at first nozzle 156. In response, base controller 110 operates pump 120 and first discharge valve 154 to achieve the first pressure at the first discharge valve 154, as sensed at second pressure sensor 157. Base controller 110 then stores the various control settings (e.g., pump speed, number of discharge valves that are open, etc.) that resulted in the first pressure being sensed at first pressure sensor 157. Base controller 110 may then further determine whether there is a differential between the pressures sensed at first pressure sensor 152 and second pressure sensor 157, and update the machine learning algorithm based on the determined pressure differential (e.g., by storing the determined pressure differential in memory 170). Base controller 110 may then modify or adjust the various controls 110 (e.g., by increasing the operating speed of pump) to achieve the desired first pressure at the first nozzle 156, as sensed by first pressure sensor 152, and update machine learning algorithm to account for the differential (e.g., by storing, in memory 170, the various control settings that provided the desired first pressure at first nozzle 156).

As an example, where the first pressure requested by a firefighter at first nozzle 156 is 100 pounds per square inch (psi), during a first operation, base controller 110 may control system 100 such that a fluid flow detected at second pressure sensor 157 is 100 psi. However, due to pressure losses between first discharge valve 154 and first nozzle 156 (e.g., resulting from friction between the fluid and first hose line 150), the actual fluid pressure detected by first pressure sensor 152 may be less than 100 psi, such as 60 psi. In response, base controller 110 may update the machine learning algorithm based on the control settings and the sensed pressures at first pressure sensor 152 and second pressure sensor 157. Base controller 110 may then increment the control settings (e.g., by increasing the speed of pump 120 and/or closing one or more valves of system 100) until the first pressure of 100 psi is sensed at first nozzle 156.

Additionally, base controller 110 may store the various control settings and/or the pressure sensed at second pressure sensor 157 when the desired first pressure was achieved at the first nozzle 156, as sensed by first pressure sensor 152. For example, base controller 110 may determine that a pressure of 125 psi at second pressure sensor 157 resulted in the first pressure of 100 psi being sensed at first pressure sensor 152. Accordingly, on subsequent deployment, when a first pressure of 100 psi is requested at first nozzle 156, machine learning algorithm may cause base controller 110 to control system 100 to operate such that fluid at second pressure sensor 157 has a pressure of 125 psi. Although described sequentially herein, during operation, base controller 110 may continuously monitor first pressure sensor 152 and second pressure sensor 157, and update the machine learning algorithm based on the detected pressures and/or pressure differentials between pressure sensors 152, 157. As a result, during normal operation, base controller 110 may control system 100 based on the pressures sensed at pressure sensors 157 and 167 while also accounting for pressure losses in hoses 150 and 160.

In the exemplary embodiment, base controller 110 is operable to determine that any one of first pressure sensor 152, second pressure sensor 162, and/or remote controllers 184 of remote components 180 are out of communication with base controller 110. For example, in some embodiments, memory 170 of base controller 110 stores instructions including a maximum signal lag time for receiving a signal from remote controllers 184. If the stored maximum signal lag is exceeded for remote controller 184 on first nozzle 156 (i.e., indicating that base controller 110 has not received a communication from remote controller 184 during the signal lag time) base controller 110 determines that communication with first pressure sensor 152 and/or remote controller 184 is interrupted. In alternative embodiments, base controller 110 determines that communication with first pressure sensor 152 and/or remote controller 184 is interrupted by determining that a signal strength of a transmission received at transceiver 172 of base controller 110 from transceiver 178 of remote controller 184 is below a predetermined threshold. In further alternative embodiments, base controller 110 determines that communication with any one of first pressure sensor 152, second pressure sensor 162, and/or remote controllers 184 is interrupted in any manner that enables base controller 110 to function as described herein.

In the exemplary embodiment, in response to determining that communication with first pressure sensor 152 and/or remote controller 184 is interrupted, base controller 110 controls system 100 based on the pressure sensed at second pressure sensor 157. For example, base controller 110 may control valves 132, 134, 142, 154, and/or 164 and pump 120 based on the operating pressures sensed by second pressure sensor 157, a last received user-requested operating pressure received from remote controller 184 and/or preset pressures stored in memory 170 of base controller 110, and machine learning algorithm to account for pressure loss within the hose 150, as described above. In the exemplary embodiment, if base controller 110 determines that communication with third pressure sensor 162 is interrupted, base controller 110 is further operable to control fluid flow to second nozzle 166 in a substantially similar manner as described above with respect to first nozzle 156. Accordingly, in the exemplary embodiment, second pressure sensor 157 and fourth pressure sensor 167 provide a back-up input for controlling system 100 in the event communication between base controller 110 and remote controllers 184 and/or sensors 152 and 162 is lost.

In the exemplary embodiment, after determining that communication with first pressure sensor 152 and/or remote controller 184 is interrupted, base controller 110 may determine that communication with first pressure sensor 152 and/or remote controller 184 is reestablished. For example, transceiver 172 of base controller 110 may receive a new transmission from transceiver 178 of remote controller 184. In the exemplary embodiment, upon determining communication with first pressure sensor 152 and/or remote controller 184 has been reestablished, base controller 110 controls system 100 based on newly received user-requested operating pressure from remote controller 184 and/or a fluid pressure sensed at first pressure sensor 152.

Although certain aspects of the disclosure are described with reference to user-requested fluid pressures, it should be understand that other user-requested parameters of fluid, such as flow rates (absolute and/or relative), may be used in addition to or as an alternative to a user-requested fluid pressure in the systems, methods, control algorithms, and techniques described herein.

Figure 5:
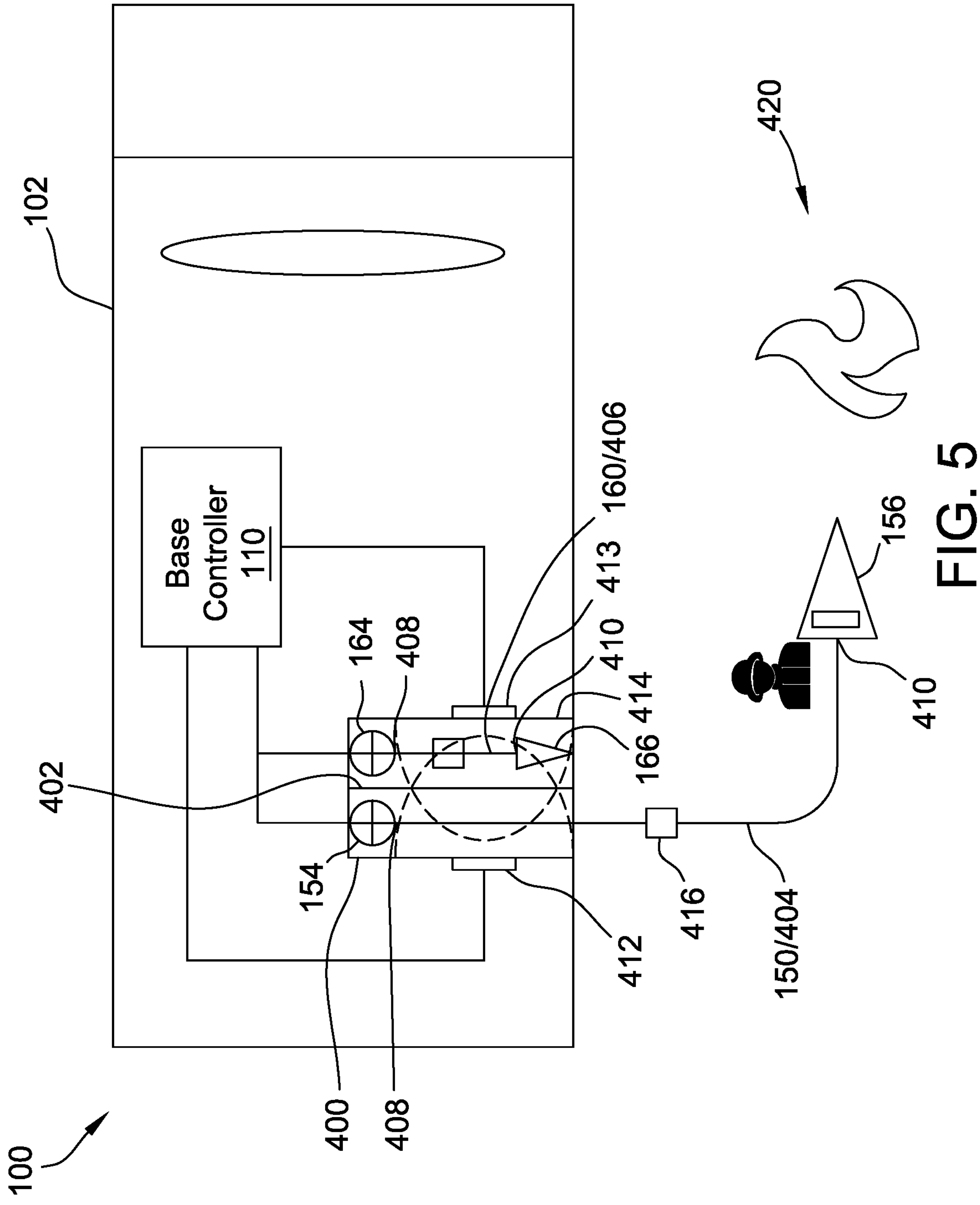
FIG. 5 is an additional schematic view of the fire-fighting system shown in FIG. 1.

FIG. 5 is an additional schematic top view of the fire-fighting system 100, shown in FIG. 1. Fire-fighting device 102 is depicted schematically as a fire-truck in FIG. 5, however, it should be understood that fire-fighting device 102 may include any fire-fighting device and/or vehicle.

In the exemplary embodiment, fire-fighting device 102 includes a hose storage compartment 400. Hose storage compartment 400 is sized to store first hose line 150 and second hose line 160 therein. More specifically, in the exemplary embodiment, hose storage compartment 400 includes a divider 402 separating first hose line 150 from second hose line 160 when the hose lines 150 and 160 are in a stored position. In alternative embodiments, hose storage compartment 400 does not include a divider 402. Although, as depicted, hose storage compartment 400 only stores two hose lines 150 and 160, it should be understood that in other embodiments, hose storage compartment 400 may be sized to store any desired number of hose lines therein.

In the exemplary embodiment, a first hose line assembly 404 includes first hose line 150 and first nozzle 156. A second hose line assembly 406 includes second hose line 160 and second nozzle 166. Each hose line 150 and 160 extends between a first end 408 removably coupled to respective discharge valves 154 and 164 and a second end 410 removably coupled to respective nozzles 156 and 166. Hose lines 150 and 160 are each moveable between a storage position (e.g., as shown with respect to second hose line 160) in which the hose lines 150 and 160 are positioned substantially within hose storage compartment 400, to an active position (e.g., as shown with respect to first hose line 150) in which second ends 410 are coupled to respective nozzles 156 and 166 and positioned out of hose storage compartment 400 and remote from fire-fighting device 102 to facilitate directing a fluid flow from the nozzles 156 and 166 to a target area, indicated generally at 420. As used herein, the hose lines 150 and 160 are "positioned substantially" within hose storage compartment 400 if at least 50 percent of the lengths of the hose lines 150 and 160 are located within hose storage compartment 400. Nozzles 156 and 166 may also be coupled to respective hose lines 150 and 160 in the storage position (e.g., as shown with respect to second hose line assembly 406). In alternative embodiments, nozzles 156 and 166 are decoupled from hose lines 150 and 160 and stored in a separate storage compartment (not shown) prior to arrival on a scene.

In the exemplary embodiment, first discharge valve 154 and second discharge valve 164 are each accessible by hose lines 150 and 160 within hose storage compartment 400 such that hose lines 150 and 160 may each be coupled to discharge valves 154 and 164 when in the stored position. As a result, upon arriving on a scene, firefighters may quickly remove hose lines 150 and 160 from hose storage compartment 400 without having to couple hose lines 150 and 160 to the respective discharge valves 154 and 164. In alternative embodiments, discharge valves 154 and 164 are positioned at any location on fire-fighting device 102 that enables fire-fighting device 102 to function as described herein.

In the exemplary embodiment, a first sensor 412 and a second sensor 413 are each coupled to fire-fighting device 102 adjacent hose storage compartment 400. Sensors 412 and 413 detect whether hose lines 150 and 160 are in the storage position. More specifically, in the exemplary embodiment, sensor 412 detects whether hose line 150 is in the storage position and sensor 413 detects whether hose line 160 is in the storage position. While two sensors 412 and 413, corresponding to the two hose lines 150 and 160 are illustrated in FIG. 5, it should be understood that, in other embodiments, a single sensor may be used to detect whether multiple hose lines 150 and 160 are in the storage position. In yet further embodiments, any number of sensors may be used to detect whether hose lines 150 and 160 are in the storage position.

In the exemplary embodiment, sensors 412 and 413 include RFID readers each coupled to a sidewall 414 of hose storage compartment 400 that are operable to detect RFID tags 416 embedded within hose lines 150 and 160. A scanning range of the respective RFID readers is indicated schematically in FIG. 5 by broken line semi-circles. In the exemplary embodiment, RFID tags 416 are coupled to hose lines 150 and 160 at a position along a length of the hose lines 150 and 160 such that, when hose lines 150 and 160 are in the active position (e.g., as shown with respect to hose line 150), RFID tags are positioned outside of the scanning range of the sensors 412 and 413. For example, in the exemplary embodiment, RFID tags 416 are positioned on hose lines 150 and 160 at approximately half of the length of the hose lines 150 and 160 from first ends 408. As a result, in the exemplary embodiment, at least 50% the length of hose lines 150 and 160 must be withdrawn from hose storage compartment 400 in order for the RFID tags 416 to exit the scanning ranges of sensors 412 and 413. In alternative embodiments, RFID tags 416 are positioned within remote components 180. In further embodiments, RFID tags 416 are located at any region of hose assemblies 404 and 406 that enables fire-fighting system 100 to function as described herein. In yet further alternative embodiments, RFID tags 416 are positioned on fire-fighting device 102 and hose assemblies 404 and 406 include RFID readers (not shown) configured to identify RFID tags 416.

In the exemplary embodiment, base controller 110 is communicatively coupled to discharge valves 154 and 164 and sensors 412 and 413. More specifically, in the exemplary embodiment, base controller 110 is coupled in wired communication with sensors 412 and 413 and discharge valves 154 and 164. In alternative embodiments, base controller 110 is coupled in wireless communication with at least one of discharge valves 154 and 164 and sensors 412 and 413. Base controller 110 may further control system 100 based on readings provided by sensors 412 and 413. More specifically, base controller 110 may automatically control an actuation state of discharge valves 154 and 164 based on a signal received from one of sensors 412 and 413 indicating whether a respective hose line 150 and 160 is in the storage position. For example, during operation, second sensor 413 generates a signal indicating that second hose line 160 is in the storage position and, in response, base controller 110 prevents opening of second discharge valve 164. Likewise, base controller 110 automatically opens first discharge valve 154 after receiving a signal from first sensor 412 indicating that first hose line 150 is not in the storage position.

In alternative embodiments, sensors 412 and 413 may include any sensor that enables fire-fighting system to operate as described herein. For example, and without limitation, in some alternative embodiments, sensors 412 and 413 include at least one scale (not shown) coupled to fire-fighting device 102 that measures the weights of hose lines 150 and 160 when hose lines 150 and 160 are positioned within hose storage compartment 400. In some such embodiments, base controller 110 may receive sensed weights from the scale (not shown) and determine whether the hose lines 150 and 160 are in the storage position by determining whether the received sensed weight exceeds a predetermined threshold. In further alternative embodiments, sensors 412 and 413 include GPS sensors (not shown) securely coupled to hose assemblies 404 and 406, or more specifically, to nozzles 156 and 166. In such embodiments, the GPS sensors detect a global position of nozzles 156 and 166 and remote controllers 184 on nozzles 156 and 166 transmit the detected positions to base controller 110. Further, in some such embodiments, an additional GPS sensor coupled to fire-fighting device 102 in communication with base controller 110 may also detect a global position of fire-fighting device 102, or more specifically, hose storage compartment 400. In such embodiments, base controller 110 determines whether hoses 150 and 160 are in the storage position by comparing the detected positions of the hose assemblies 404 and 406 to the detected position of the fire-fighting device 102.

In yet further alternative embodiments, sensors 412 and 413 may include a mechanical sensor. For example, and without limitation, in some such embodiments, extension of a portion of at least one of hose lines 150 and 160 from hose storage compartment 400 may trip a latch (not shown) positioned within hose storage compartment 400. Tripping of the latch may cause a signal to be transmitted to base controller 110 which indicates that at least one of the hose lines 150 and 160 is no longer in the storage position.

The above-described embodiments provide a cost-effective and reliable means of improving the control of a fire-fighting device. More specifically, the exemplary systems and method described herein overcome disadvantages of known fire-fighting control systems by enabling remote control of a fire-fighting device by a firefighter positioned a remote distance away from the device. As such, an additional user does not need to be positioned near the fire-fighting device to manually control the fire-fighting device. Moreover, the embodiments described herein also enable automated control of safety components of a fire-fighting system. For example, some embodiments, described herein enable control of fire-fighting system components based on detected movement of the nozzle or a detected proximity of the nozzle to the firefighter. Accordingly, the systems described herein improve firefighter safety by automatically trigger emergency procedures automatically when a firefighter is incapacitated or becomes separated from their nozzle. As a result, the systems described herein facilitate increasing the efficiency of the fire-fighting control system in a cost-effective and reliable manner, while also improving firefighter safety.

Exemplary embodiments of systems and methods for the remote control of a fire-fighting device are described above in detail. The methods and apparatus are not limited to the specific embodiments described herein, but rather, components of systems and/or steps of the methods may be utilized independently and separately from other components and/or steps described herein. For example, the systems and methods may also be used in combination with other fire-fighting systems and methods, and are not limited to practice with only the fire-fighting device as described herein. Rather, the exemplary embodiment can be implemented and utilized in connection with many other fire-fighting devices.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fire-fighting system comprising:

a pump;

a nozzle for directing fluid from said pump to a target area, said nozzle comprising a first pressure sensor configured to detect a first fluid pressure of the fluid at said nozzle;

a discharge valve controlling fluid flow between said pump and said nozzle;

a second pressure sensor configured to detect a second fluid pressure of the fluid at said discharge valve; and a controller communicatively coupled to said first pressure sensor and said second pressure sensor, said controller configured to:

control operation of at least one of said pump and said discharge valve based on a user-requested fluid pressure and the detected first fluid pressure at said nozzle in a primary mode of operation; and control operation of said at least one of said pump and said discharge valve based on the user-requested fluid pressure and the detected second fluid pressure at said discharge valve in a secondary mode of operation when signal communication between said first pressure sensor and said controller is interrupted.

2. The fire-fighting system of claim 1, wherein said nozzle further comprises a transceiver communicatively coupled to said first pressure sensor and configured for wireless communication with said controller.

3. The fire-fighting system of claim 2, wherein said nozzle further comprises a user-interface communicatively coupled to said transceiver and configured to receive the user-requested fluid pressure from a user, said transceiver configured to transmit the user-requested fluid pressure to said controller.

4. The fire-fighting system of claim 3, wherein said controller is further configured to control operation of said at least one of said pump and said discharge valve based on the user-requested fluid pressure last received at said controller from said transceiver.

5. The fire-fighting system of claim 1, wherein said controller is further configured to control operation of said discharge valve by controlling an actuation state of said discharge valve.

6. The fire-fighting system of claim 1, wherein said controller is further configured to control operation of said pump by at least one of: (i) controlling a speed of said pump and (ii) controlling an actuation state of an additional valve of said fire-fighting system, wherein the additional valve is coupled in fluid communication with said pump.

7. The fire-fighting system of claim 1, wherein said controller is further configured to determine that communication between said first pressure sensor and said controller has been interrupted by determining that the time since a last received signal from said first pressure sensor exceeds a predetermined time threshold.

8. The fire-fighting system of claim 1, wherein the user-requested fluid pressure is a preset pressure associated with said nozzle and stored on a memory located at said nozzle.

9. The fire-fighting system of claim 1, wherein said nozzle is a first nozzle and said discharge valve is a first discharge valve, the fire-fighting system further comprising:

a second nozzle for directing fluid flow from said pump to a target area, said second nozzle comprising a third pressure sensor configured to detect a third fluid pressure of fluid at said second nozzle;

a second discharge valve controlling fluid flow between said pump and said second nozzle; and a fourth pressure sensor configured to detect a fourth fluid pressure of the fluid at said second discharge valve.

10. The fire-fighting system of claim 9, wherein said controller is further configured to:

control operation of at least one of said pump and said second discharge valve based on a user-requested fluid pressure at said second nozzle and the detected third fluid pressure of fluid at said second nozzle in the primary mode of operation; and control operation of said at least one of said pump and said second discharge valve based on the user-requested fluid pressure at said second nozzle and the detected fourth fluid pressure at said second discharge valve in a tertiary mode of operation when communication between said third pressure sensor and said controller is interrupted.

11. The fire-fighting system of claim 1 further comprising a fire-fighting device, wherein said pump and said controller are located at said fire-fighting device and said nozzle is configured to be positioned remote from said fire-fighting device.

12. A method of controlling a fire-fighting device including a pump, said method comprising:

receiving, at a controller, a first pressure signal from a first pressure sensor coupled to a nozzle, the first pressure signal indicative of a first fluid pressure of a fluid at the nozzle;

receiving, at the controller, a second pressure signal from a second pressure sensor located remote from the first pressure sensor, the second pressure signal indicative of a second fluid pressure of fluid at a discharge valve that controls fluid flow between the pump and the nozzle;

controlling operation of at least one of the pump and the discharge valve based on a user-requested fluid pressure and the first pressure signal in a primary mode of operation; and controlling operation of the at least one of the pump and the discharge valve based on the user-requested fluid pressure and the second pressure signal in a secondary mode of operation when signal communication between the first pressure sensor and the controller is interrupted.

13. The method of claim 12 further comprising transmitting, via a transceiver communicatively coupled to the first pressure sensor, the first pressure signal to the controller.

14. The method of claim 13 further comprising:

receiving, at a user-interface communicatively coupled to the transceiver, the user-requested fluid pressure from a user; and transmitting, via the transceiver, the user-requested fluid pressure to the controller.

15. The method of claim 14 further comprising receiving a plurality of user-requested fluid pressures from the transceiver, wherein said controlling operation of the at least one of the pump and the discharge valve is based on the most recently received user-requested fluid pressure of the plurality of user-requested fluid pressures.

16. The method of claim 12, wherein said controlling operation of the at least one of the pump and the discharge valve in the primary mode of operation and the secondary mode of operation comprises controlling an actuation state of the discharge valve.

17. The method of claim 12, wherein said controlling operation of the at least one of the pump and the discharge valve in the primary mode of operation and the secondary mode of operation comprises controlling operation of the pump by controlling a speed of the pump.

18. The method of claim 12 further comprising determining that communication between the first pressure sensor and the controller is interrupted by determining that a time since a last received signal from the first pressure sensor exceeds a predetermined time threshold.

19. A controller for use with a fire-fighting device including a pump, said controller configured for communication with a first pressure sensor coupled to a nozzle, said controller further configured for communication with a second pressure sensor located remote from the first pressure sensor, said controller configured to:

receive a first pressure signal from the first pressure sensor, the first pressure signal indicative of a first fluid pressure of a fluid at the nozzle;

receive a second pressure signal from the second pressure sensor, the second pressure signal indicative of a second fluid pressure of fluid at a discharge valve that controls fluid flow between the pump and the nozzle;

control operation of at least one of the pump and the discharge valve based on a user-requested fluid pressure and the first pressure signal in a primary mode of operation; and control operation of the at least one of the pump and the discharge valve based on the user-requested fluid pressure and the second pressure signal in a secondary mode of operation when signal communication between the first pressure sensor and the controller is interrupted.

20. The controller of claim 19, wherein said controller is further configured to determine that communication between the first pressure sensor and the controller is interrupted by determining that a time since a last received signal from the first pressure sensor exceeds a predetermined time threshold.

* * * * *